United States Patent Office 2,892,680
Patented June 30, 1959

2,892,680

RECOVERY OF CESIUM FROM WASTE SOLUTIONS

Warren H. Burgus, Idaho Falls, Idaho, assignor to the United States of America as represented by the United States Atomic Energy Commission No Drawing. Application August 20, 1956
Serial No. 605,235

7 Claims. (Cl. 23—25)

This application deals with the separation or recovery of cesium values in pure form from aqueous solutions conaining said values together with other cation values.

When uranium is bombarded with neutrons of thermal energy, fission products and transuranic elements including plutonium are formed. In processing such neutron-irradiated uranium for the isolation of the plutonium and the uranium, e.g. by extraction or precipitation, aqueous waste solutions are obtained which contain the bulk of the fission products formed during irradiation. One of the fission products present in such aqueous waste solutions is cesium. In a waste solution which had been stored for about six years, for instance, 98% of the radioactivity was found to be due to cesium. These waste solutions usually contain comparatively high concentrations of salts the addition of which was necessary for the various processing steps, such as aluminum nitrate, mercury nitrate, and sodium nitrate, and of acids, such as nitric acid; however, they contain the fission product values, including the cesium values, in comparatively very small concentrations.

One of the predominant cesium isotopes present in the above-described type of waste solutions is $Cs^{137}$ which is a gamma- and beta-emitter. $Cs^{137}$ represents a source for gamma and beta rays of rather constant strength due to its long half-life (37 years). On account of this characteristic, $Cs^{137}$ has been found useful for food and drug sterilization, for the polymerization of organic hydrocarbons, for the production of mobile high-voltage, low-current sources (atomic batteries), for teletherapy and for radiography.

It is an object of this invention to provide a process for recovering cesium values from aqueous solutions in which it is present in a comparatively very low concentration.

It is another object of this invention to provide a process of recovering cesium values from aqueous solutions which contain salts and acids, such as aluminum nitrate, sodium nitrate, and nitric acid in high concentrations without the necessity of removing any of the salts or neutralizing the acid.

It is also an object of this invention to provide a process of recovering cesium values from aqueous solutions which does not require adjustment of the pH value of these aqueous solutions.

These objects are accomplished by incorporating a nickel ferrocyanide or ferric ferrocyanide carrier into the aqueous solution to be treated whereby the cesium values and some of the fission product values are precipitated on said carrier, separating the cesium-containing carrier precipitate from the solution, and then selectively leaching the carrier precipitate with an aqueous medium whereby the cesium is dissolved while the other coprecipitated fission product values are retained on the carrier.

The precipitation on the ferrocyanide carrier can be carried out from an acid as well as from an alkaline solution. While the carrier can be added as such to the cesium-containing solution, it is preferred to form the carrier in situ by separately adding an alkali metal ferrocyanide and a water-soluble nickel or ferric salt to the solution. After precipitation, the mixture is advantageously allowed to digest at least for several hours whereby separation of the precipitate from the supernatant is facilitated. Separation can be carried out by any means known to those skilled in the art, such as filtration, decantation and centrifugation.

The aqueous media found best suitable for leaching the cesium values from the ferric or nickel carrier precipitate are an aqueous ammonium hydroxide solution or a solution of mercuric nitrate, respectively. In both instances the cesium is selectively leached out while the other coprecipitated fission product values are retained by the ferric hydroxide formed or the nickel carrier precipitate. Leaching with simply water is also effective; however, in this case the carrier precipitate has to be subjected to a calcining step prior to leaching. The leaching with ammonia or with mercuric nitrate solution according to this invention represents a simpler and consequently cheaper method since less steps are necessary.

The cesium-containing solution obtained by the selective leaching can then be subjected to further purification, e.g., by treatment with cation exchange resins, and the cesium solution thus purified can then be subjected to any process known to those skilled in the art for the recovery of cesium, the specific process depending on the use intended for the cesium.

In the following, two examples are given for the purpose of illustrating the efficiency of the process of this invention. These examples are not intended to limit the scope of the invention to the details given therein.

*Example I*

A synthetic waste solution was made up, and inactive cesium was added to approximately the cesium concentration in actual plant waste. The composition of the solution then was:

1.10 M aluminum nitrate,
0.625 M nitric acid,
0.004 M mercuric nitrate,
0.075 M sodium nirate, and
19 mg. cesium/l.

To 25 ml. of the above synthetic waste solution, at 25° C., a 1.0 M nickel nitrate solution was added to obtain a final nickel concentration of 0.02 M. Then 0.5 M sodium ferrocyanide was added to make the solution 0.01 M in ferrocyanide. The resulting slurry was stirred for ½ hour at 25° C., the solids were centrifuged out in a clinical centrifuge, and the supernatant liquid was decanted off. The separated solids were then stirred with 10 ml. of a 0.01 M nitric acid at room temperature and then centrifuged out; thereafter the wash liquid was decanted. The solids then were stirred with 10 ml. of water and centrifuged out; the wash water was decanted. The combined cesium losses, to the supernatant waste liquid and to the wash solutions, totaled less than 1%. In other words, the yield was greater than 99% in the scavenging step.

The precipitate was then suspended and stirred for ½ hour in 25 ml. of a solution 0.01 M in nitric acid and 0.03 M in mercuric nitrate at 40° C. The remaining solids were centrifuged out in a clinical centrifuge; the cesium in the supernatant liquid was analyzed. It was found that more than 99% of the cesium present in the precipitate had been recovered.

*Example II*

A synthetic wase solution was made up, and inactive cesium was added to approximately the cesium concentration in actual plant waste. The composition of this solution was:

2.20 M aluminum nitrate,
1.25 M nitric acid,
0.008 M mercuric nitrate,
0.150 M sodium nitrate, and
38 mg. cesium/l.

To 25 ml. of this solution, at 25° C., a 2.0 M ferric nitrate solution was added to make the final solution 0.04 M in iron. Then sufficient 0.50 M sodium ferrocyanide solution was added to obtain a final ferrocyanide concentration of 0.03 M. The resulting slurry was stirred for 5 minutes, the solids were centrifuged out in a clinical centrifuge, and the supernatant waste liquid was decanted off.

The separated solids were then washed with 10 ml. of a 0.01 M nitric acid and centrifuged out; the washings were decanted off, and the solids were again washed in a similar manner with 10 ml. of water. The wash liquid was separated as before. The cesium recovery in the precipitate was 93.5%.

The precipitate was then stirred for ½ hour at room temperature using 25 ml. of a solution containing the 10-fold excess of ammonium hydroxide as to the amount required for metathesizing ferric ferrocyanide to ferric hydroxide and ammonium ferrocyanide (stoichiometric ratio: 12 moles $NH_4OH$ per 1 mole ferric ferrocyanide). The pH value of the solution formed was approximately 10.1. The product recovery from the precipitate was well over 99% of the cesium present therein.

It will be understood that this invention is not to be limited to the details given herein but that it may be modified within the scope of the appended claims.

What is claimed is:

1. A process of separating cesium values from aqueous solutions containing said cesium values in comparatively very small concentrations and aluminum nitrate, mercury nitrate, sodium nitrate and nitric acid in comparatively high concentrations consisting of adding a carrier to said solution whereby said cesium values are precipitated on said carrier, said carrier being selected from the group consisting of nickel ferrocyanide and ferric ferrocyanide; separating the carrier containing said cesium values from the solution; and then leaching said carrier with at least a stoichiometric quantity of an aqueous medium selected from the group consisting of an ammonia solution and a mercuric nitrate solution whereby said cesium values are selectively dissolved.

2. The process of claim 1 wherein the carrier is ferric ferrocyanide and the aqueous medium is an ammonia solution.

3. The process of claim 1 wherein the carrier is nickel ferrocyanide and the aqueous medium is a mercuric nitrate solution of a concentration of 0.03 M.

4. A process of separating cesium values from aqueous solutions containing said cesium values, in comparatively very small concentrations and aluminum nitrate, mercury nitrate, sodium nitrate and nitric acid in comparatively high concentrations, consisting of adding alkali metal ferrocyanide and a water-soluble metal salt selected from the group consisting of nickel nitrate and ferric nitrate to said solution whereby a metal ferrocyanide carrier forms and said cesium values are precipitated on said carrier while the aluminum nitrate, mercury nitrate, sodium nitrate and nitric acid remain in the solution; separating the carrier precipitate containing said cesium values from the solution; and then leaching said carrier precipitate with at least the stoichiometric amount of an aqueous medium selected from the group consisting of an ammonia solution and a mercuric nitrate solution whereby said cesium values are selectively dissolved.

5. A process of leaching cesium values from a ferrocyanide precipitate carrier carrying said cesium values, said carrier being selected from the group consisting of nickel ferrocyanide and ferric ferrocyanide, consisting of contacting said carrier with at least the stoichiometric amount of an aqueous solution of ammonium hydroxide whereby said cesium values are dissolved while the carrier remains undissolved.

6. A process of leaching cesium values from a ferrocyanide precipitate carrier carrying said cesium values, said carrier being selected from the group consisting of nickel ferrocyanide and ferric ferrocyanide, consisting of contacting the carrier with at least the stoichiometric amount of an aqueous nitric acid solution of mercuric nitrate whereby said cesium values are dissolved while the carrier remains undissolved.

7. The process of claim 6 wherein the mercuric nitrate solution has a concentration of about 0.03 M mercuric nitrate and contains nitric acid in a concentration of about 0.01 M.

References Cited in the file of this patent

UNITED STATES PATENTS 2,769,780    Clifford et al. _____ Nov. 6, 1956

OTHER REFERENCES

Mitchell: "Recent Advances in Analytical Chemistry," P. Blakiston Son and Co., Inc., Philadelphia, Pa. (1931), vol. II, pages 302–3.

Hahn et al.: "Chemical Abstracts," vol. 43, No. 11, pages 4127h, June 1949.

Rodden: "Analytical Chemistry of the Manhattan Project," pages 214–215, 1950, McGraw-Hill Book Co., New York.